United States Patent [19]

McDermott

[11] 3,792,710
[45] Feb. 19, 1974

[54] PUMP AND VALVE MEANS
[75] Inventor: Hugh L. McDermott, Minneapolis, Minn.
[73] Assignee: Safe Way Hydraulics, Inc., Minneapolis, Minn.
[22] Filed: May 22, 1972
[21] Appl. No.: 244,946

[52] U.S. Cl.................. 137/102, 91/420, 137/112, 137/596.2
[51] Int. Cl........................... G05d 7/01, F15b 7/06
[58] Field of Search. 137/596.2, 102, 112; 417/291; 91/420

[56] References Cited
UNITED STATES PATENTS
3,233,407  2/1966  Smith.............................. 91/420 X
3,266,381  8/1966  Rohde................................. 91/420
3,272,086  9/1966  Soeters........................... 137/596.2
2,720,755  10/1955  Gardiner........................... 91/420 X
3,145,734  8/1964  Lee et al............................... 91/420

FOREIGN PATENTS OR APPLICATIONS
957,851  5/1964  Great Britain....................... 91/420

Primary Examiner—Carlton R. Croyle
Assistant Examiner—Richard Sher
Attorney, Agent, or Firm—Merchant, Gould, Smith & Edell

[57] ABSTRACT

A motor driven pump and valve assembly including a reversible pump and valve mechanism for controlling flow of fluid between the pump and a fluid pressure operated device driven by fluid from the pump. The valve mechanism includes a movable valve element and check valve operative to provide a fluid lock for the device when the pump is inoperative.

2 Claims, 5 Drawing Figures

3,792,710

PUMP AND VALVE MEANS

An important object of this invention is the provision of a pump and valve means which can be used to advantage in a closed fluid pressure system.

Another important object of this invention is the provision of a pump and valve mechanism which, when disposed in a closed fluid circuit with a fluid pressure operated device, automatically compensates for differential in fluid quantity which may be present at opposite portions of the device.

Another object of this invention is the provision of a pump and valve means including a closed reservoir system, all of which can be made in compact form.

Still another object of this invention is the provision of a motor driven pump and valve means as set forth which, when operatively coupled to a fluid pressure operated device, will provide a fluid lock to the device when the motor is deenergized.

Another object of this invention is the provision of valve mechanism having a minimum number of moving parts and operative to function with equal facility in either direction of operation of the pump.

To the above ends, a pump and valve means is provided including; a housing defining a pump chamber, a valve chamber, ports providing an inlet and an outlet and adapted for connection to opposite sides of a fluid pressure operated device, and fluid passages interconnecting the ports, pump chamber and valve chamber; a pump rotor rotatably mounted in the pump chamber; a valve element movable between a neutral position and oppositely spaced operative position in the valve chamber; and check valves between the ports and the valve chamber; the valve element having opposite portions operative to selectively open the check valves when the valve element is moved by fluid pressure in one or the other direction away from its neutral position. A closed fluid reservoir is mounted on the housing and communicates with the valve chamber to receive excess fluid from the system or to supply fluid to the system as required.

DESCRIPTION OF THE DRAWINGS

FIG. 5 is a fragmentary section taken on the line 5—5 of FIG. 1.

DETAILED DESCRIPTION OF THE PREFERRED EMBODIMENT

Figure 1:
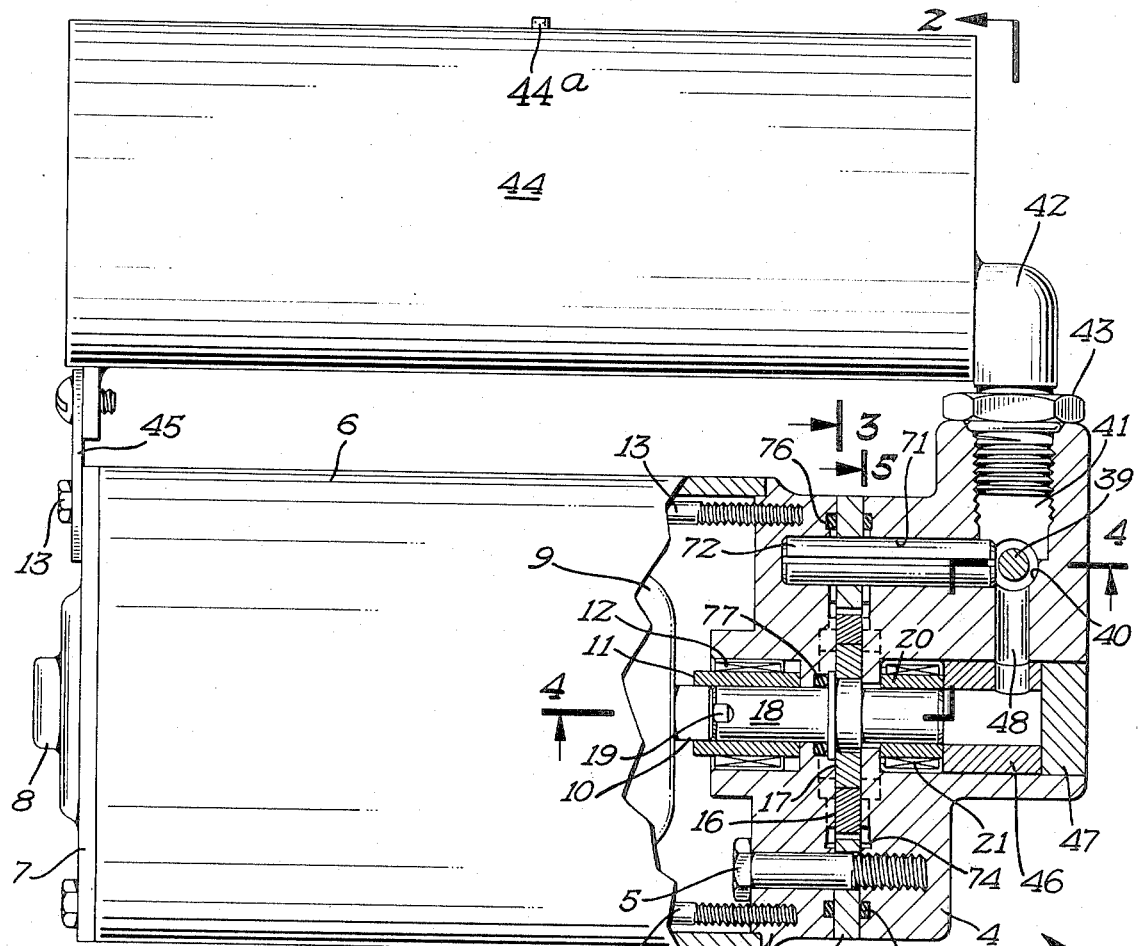
FIG. 1 is a view in side elevation of a pump and valve means produced in accordance with this invention, some parts being broken away and some parts being shown in section.

The pump and valve means of this invention includes housing means, indicated generally at 1, and comprising a motor mounting section 2, a ring section 3, and a valve section 4. The housing sections 2, 3, and 4 are rigidly secured together in face to face relationship by a plurality of machine screws or the like 5. The motor mounting section 2 functions as an end bell for a conventional electric motor of the reversible type, the motor including a generally cylindrical casing 6, an outer end bell or wall 7 formed with a bearing boss 8, and the usual armature 9 provided with a drive shaft 10. The outer end portion of the drive shaft 10 is mounted in a sleeve 11 that is journalled in the housing section 2 by a rolling friction bearing 12. The casing 6 and end bell 7 are rigidly mounted on the motor mounting housing section 2 by a plurality of elongated mounting screws 13.

Figure 3:
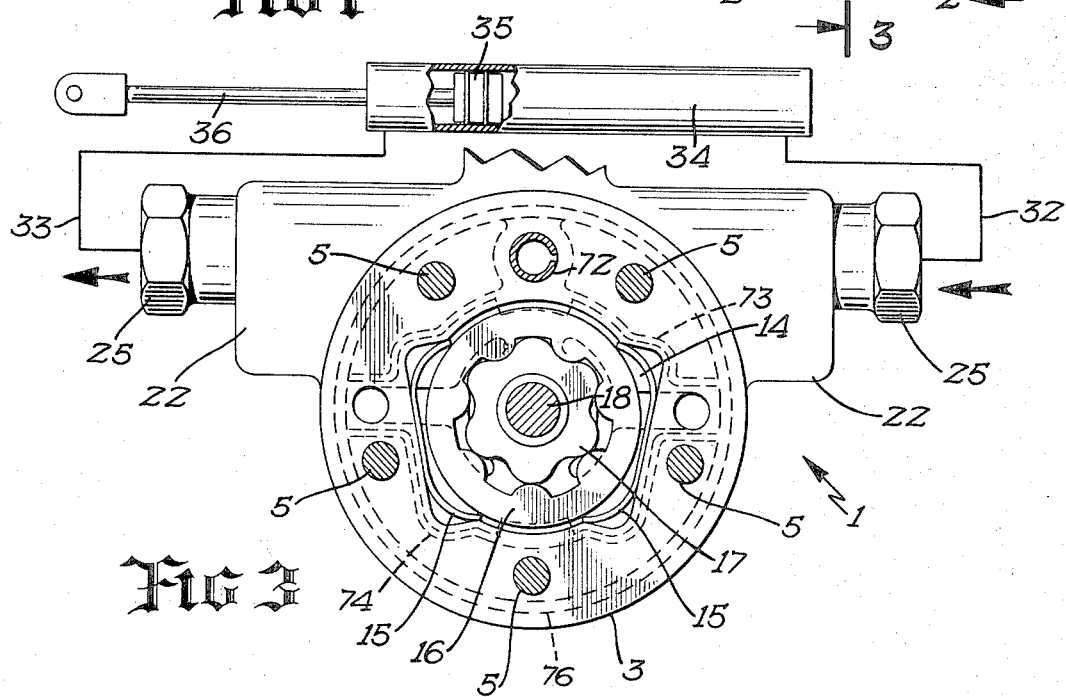
FIG. 3 is a transverse section taken on the line 3—3 of FIG. 1, some parts being removed.

The housing ring section 3 is disposed in face to face relationship with adjacent end surfaces of the housing sections 2 and 4, and cooperates therewith to define a pump chamber 14 having therein a pair of substantially diametrically opposed resilient clips 15 which journal an internally toothed ring member 16. An externally toothed member, commonly termed a star member 17, is disposed within the ring member 16 in meshing engagement therewith and eccentric thereto. The star member 17 is rigidly mounted on an axial drive shaft 18 for common rotation therewith, one end portion of the drive shaft 10 being keyed to the shaft 18 as indicated at 19, see FIG. 1. The opposite end portion of the shaft 18 is mounted in a sleeve 20 which forms the inner face of a rolling friction bearing 21 mounted in the valve housing section 4, see FIGS. 1 and 4. The arrangement of ring member 16 and star member 17 is such that each thereof rotates on an axis in laterally spaced parallel relationship to the axis of the other thereof, the ring and star members cooperating to define alternately expanding and contracting fluid chambers. The members 16 and 17 are used in fluid pumps produced under the trademark "GEROTOR". As shown in FIG. 3, the ring member 16 is loosely disposed within the pump chamber 14, the resilient clips 15 serving to hold the ring member 16 against lateral movement during rotation of the members 16 and 17 on their respective axes.

The valve section 4 of the housing means 1 is formed to provide a pair of opposed laterally outwardly projecting bosses 22 which define a pair of axially aligned screw threaded ports 23 and 24 having conventional conduit fittings 25 screw threaded thereinto. The ports 23 and 24 are counterbored to receive a pair of primary check valves 26 and 27 respectively, each of the check valves 26 and 27 including a valve seat 28 defining one end of a check valve opening 29 of predetermined diameter. Each primary check valve 26 and 27 includes a check valve element or ball 30 that is yieldingly urged into sealing or valve closing engagement with its respective valve seat 28 by means of a coil compression spring 31. As shown diagrammatically in FIG. 3, the fittings 25 are adapted to be connected to respective ones of a pair of conduits 32 and 33 which extend to opposite sides or ends of a fluid pressure operated motor, such as a cylinder 34 having a piston 35 axially slidable therein. The piston 35 is provided with the usual piston rod 36 that projects axially outwardly through one end of the cylinder 34.

Figure 2:
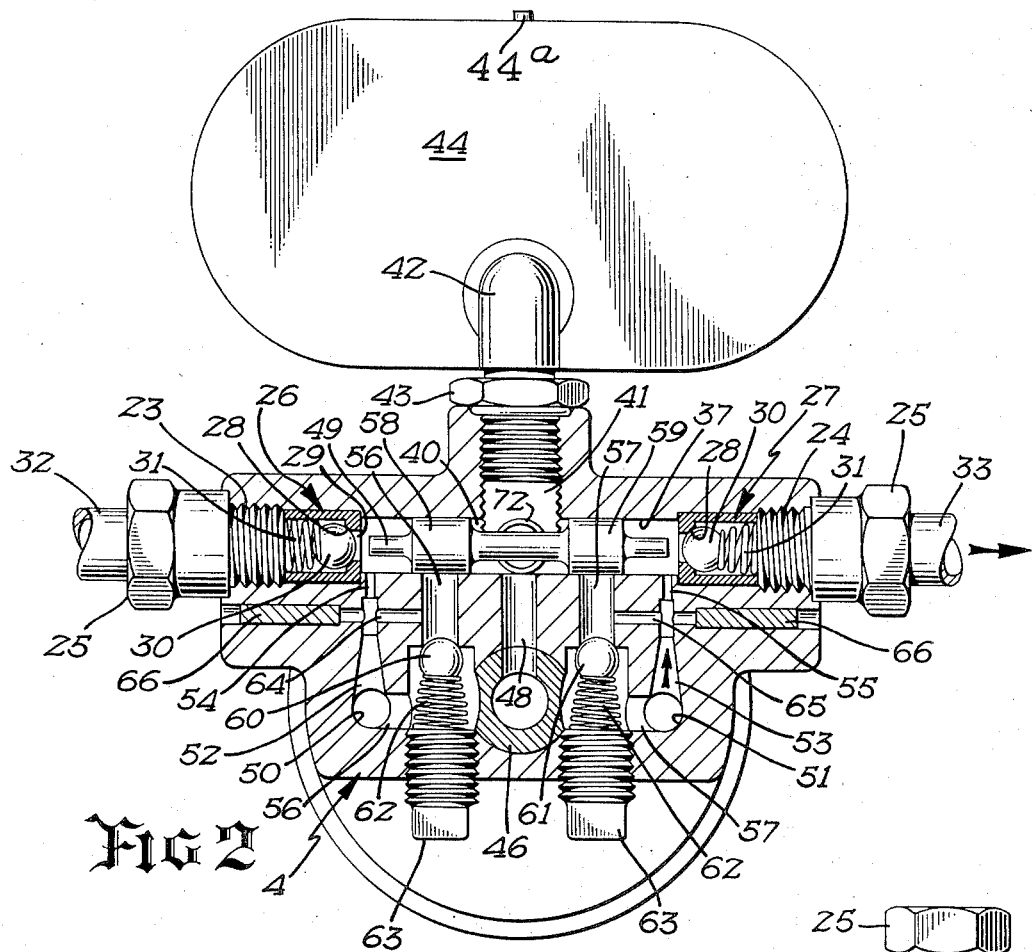
FIG. 2 is a view partly in end elevation and partly in transverse section, taken substantially on the line 2—2 of FIG. 1.
Figure 3:
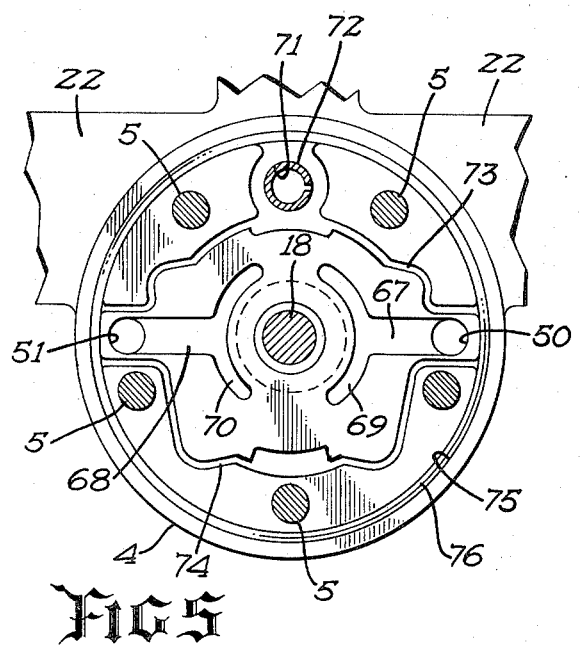
Figure 4:
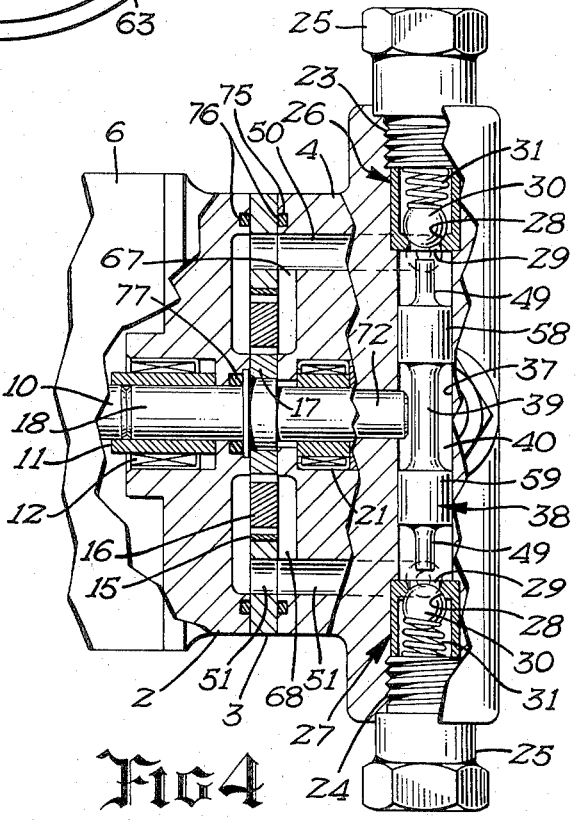
FIG. 4 is a fragmentary section taken on the irregular line 4—4 of FIG. 1.

Between the primary check valves 26 and 27, the housing section 4 is bored or otherwise formed to provide an elongated cylindrical valve chamber 37 of substantially larger diameter than that of the check valve openings 29. A spool valve element 38 is axially slidably mounted in the valve chamber 37, and has a diametrically reduced central portion 39 that cooperates with the cylindrical wall of the valve chamber 37 to define an annular fluid passage portion 40 that communicates with a fluid supply port 41 having conduit means 42 including a fitting 43 screw threaded in the port 41. The conduit means 4 communicates with a fluid reservoir 44 that extends longitudinally with respect to the motor casing 6 and which is rigidly secured at its end opposite the conduit means 42 to the end bell 7 of the motor casing 6 by means including a bracket 45, see FIG. 1. The fluid reservoir 44 is closed except for its communication with the supply port and a vent, 44a for neutralizing pressure with the reservoir 41. With reference to FIGS. 1 and 2, it will be seen that the valve chamber 37 is disposed at a level above that of the pump shaft 18. The housing section 4 is bored to receive the pump shaft bearing 21 axially outwardly of which is disposed a tubular member 46 that is held in place by a conventional plug 47. The housing section 4 and tubular member 46 are also bored to provide a fluid passage 48 establishing communication between the passage portion 40 and interior of the tubular member 46, so that fluid may be supplied to the bearing 21 or excess fluid may be withdrawn therefrom, as will hereinafter become apparent. With reference particularly to FIGS. 2 and 4, it will be seen that the spool valve element 38 is provided at its opposite ends with axially outwardly projecting reduced diameter stem portions 49 each of which is adapted to project through an adjacent one of the check valve openings 29 to engage and unseat the adjacent check ball 30 upon movement of the spool valve element 38 in either direction axially of a neutral position thereof centrally of the valve chamber 37.

The valve housing section 4 is formed with other fluid passage means including a pair of fluid passages 50 and 51 each extending generally longitudinally of the assembly, through the housing ring section 3 and into the adjacent end of the motor mounting housing section 2, as shown in FIG. 4. Within the valve housing section 4, the fluid passages 50 and 51 are formed to provide upwardly extending tapered portions 52 and 53 respectively to form venturi throats 54 and 55 respectively that communicate with ends of the valve chamber 37 adjacent the primary check valves 26 and 27 respectively. As shown particularly in FIG. 2, the valve housing section 4 is further formed to provide a pair of generally L-shaped branch passages 56 and 57 that extend from respective ones of the passages 50 and 51 to the valve chamber 37 in axially inwardly spaced relationship to the venturi throat portions 54 and 55 respectively. As shown in FIG. 2, the diametrically enlarged spool portions 58 and 59 of the spool valve element 38 overlie and shut off the upper ends of respective branch passages 56 and 57 when the spool valve 38 is in its centrally disposed neutral position of FIGS. 2 and 4. Intermediate their ends, the branch passages 56 and 57 are enlarged to provide valve seats for respective spring pressed secondary ball check valves 60 and 61 that are adapted to permit flow of fluid from the valve chamber 37 through their respective branch passages 56 and 57, but to bar flow of fluid to the valve chamber 37 through their respective branch passages 56 and 57. Secondary ball check valve springs 62 are held in place, and the branch passages 56 and 57 are sealed off from the exterior of the housing by conventional pipe plugs 63 screw threaded into threaded apertures in the housing section 4, as shown in FIG. 2. A pair of shunt passages 64 and 65 are drilled in the opposite side portions of the housing section 4 to establish communication between the upper end portions of the branch passages 56 and 57 with respective ones of the venturi throat portions 54 and 55. The drilled holes are closed laterally outwardly of the venturi throat portions 54 and 55 by plugs 66.

The end faces of the housing sections 2 and 4 adjacent the ring section 3 are formed to provide fluid passages in the nature of grooves 67 and 68 that extend radially inwardly from the passages 50 and 51 respectively and terminate in respective arcuate groove portions 69 and 70. These groove portions 69 and 70, as shown in FIG. 5, are diametrically opposed, one of the grooves 69 and 70 communicating with expanding ones of the fluid chambers defined by the teeth of the ring and star member 16 and 17, the other of the grooves 69 and 70 communicating with the contracting fluid chambers defined by said teeth, depending upon the direction of rotation of the ring and star members 16 and 17. It should here be noted that one of the ports 23 and 24 is an inlet port, the other being an outlet port, also depending upon the direction of rotation of the ring and star members 16 and 17.

For the purpose of aiding in the proper alignment of the housing sections 2, 3 and 4, and for the purpose of relieving fluid pressures between these sections, the sections 2, 3 and 4 are drilled to provide a longitudinal bore 71 that extends longitudinally inwardly of the assembly from the central passage portion 40 and of the valve chamber 37. A longitudinally split tubular pin, commonly known as a roll pin 72 is snugly fitted in the bore 71 and has one end projecting into the valve chamber and engageable with the spool portions 58 and 59 to limit axial movement of the valve element 38 in opposite directions. Radially outwardly of the pump chamber 14, the adjacent end faces of the housing sections 2 and 4 are formed to provide a pair of fluid channels 73 and 74 that communicate with annular channels 75 containing sealing rings 76, the sealing rings being preferably in the nature of commercially available O-rings. Intermediate their ends, the fluid channels 73 communicate with their respective annular channels 75 by interconnecting annular channels 77 encircling the roll pin 72, see particularly FIGS. 1 and 5. Due to the fact that there is predetermined running clearance between the rotary pump members and the adjacent faces of the housing sections 2 and 4, and also due to the pressures developed by the rotary pump members, fluid tends to be forced radially outwardly between the housing sections 2, 3 and 4 to adversely increase said running clearance between the pump members and housing sections. This fluid enters the channels 73 and 74, and is conducted to the interior of the roll pin 72 where the pressure is considerably less than in the pump chamber 14, thus relieving the pressure between the pump members and housing sections. The O-rings 76 effectively prevent leakage of fluid outwardly to the exterior of the housing 1, and an O-ring 77, encompassing the shaft 18 of the star member 17, prevents leakage of fluid into the interior of the motor casing 6.

OPERATION

With the motor deenergized, the valve element 38 assumes a neutral position generally centrally between the primary check valves 26 and 27, and the piston 35 of the cylinder 34 is hydraulically locked against movement in either direction, assuming that the fluid in the system is incompressible hydraulic liquid. In the structure shown, it will be seen that the check valve springs 31 are relatively heavy, the valve springs 62 of the secondary check valves being relatively light springs. As soon as the motor is energized to cause rotation of its drive shaft 10 in a given direction, the pump members 16 and 17 will draw fluid through one of the passages 50 and 51 from one end of the valve chamber 37 and discharge fluid under pressure through the other one of the passages 50 and 51 to the opposite end of the valve chamber 37. By way of example, assuming that the pump members 16 and 17 are rotating in a direction to exert negative pressure in the fluid passage 50 and positive pressure in the fluid passage 51, the valve spool element 38 will be moved to the left with respect to FIG. 2 until the left hand stem 49 thereof engages a ball 30 of the primary check valve 26. The overall area of the axially outer end of the valve spool 59 and its adjacent stem 49 is substantially greater than the area of the opening 29 in the check valve 27. Hence, the valve element 38 will be continually moved to the left to open the check valve 26 to permit fluid to enter the adjacent end of the valve chamber, venturi throat 54, tapered passage portion 52 and fluid passage 50 to the pump. It should here be noted that the arrangement of the spools 58 and 59 on the valve element 38 is such that the upper end of the branch passage 56 will be open to the supply port 41 through the passage portion 40 before the stem 49 adjacent the spool portion 58 engages the ball of the primary check valve 26, so that there is no lack of fluid available to the intake portion of the pump. As the pump continues to operate, the secondary check valve ball 60 is unseated to permit fluid to flow freely to the intake side of the pump from the reservoir 44. As pressure rises within the valve chamber 37 adjacent the primary check valve 27, the valve element 38 moves further toward the left with respect to FIG. 2 to open the check valve 26, and fluid pressure causes the check valve 27 to open to permit delivery of fluid to the cylinder 34 through the conduit 33. With the spool valve element 38 moved to the left as described, fluid from the pump is delivered to the valve chamber not only through the venturi throat 55, but also through the shunt passage 65 and upper end portion of the branch passage 57. In the arrangement illustrated in FIG. 3, with the piston rod 36 extending from one end only of the piston 35, a quantity or volume differential exists in the flow of fluid to and from opposite ends of the cylinder 34. Thus, when the pump element 16 and 17 are rotated in a direction to deliver fluid through the conduit 33 to the cylinder 34, as above described, a greater volume of fluid is returned to the valve housing 1 from the cylinder 34 than is delivered to the cylinder 34. The volume of return fluid in excess of that which is delivered to the pump flows through the shunt passage 64 to the upper end portion of the branch passage 56, through the passage portion 40 and port 41 into the reservoir 44.

When the motor is deenergized to stop rotation of the pump members 16 and 17, both primary check valves 26 and 27 will close due to action of the springs 31 thereof against the check balls 30, moving the valve spool element 38 toward its neutral position. During closing of the primary check valve 26, the adjacent valve element stem 49 is engaged by the valve ball 30 thereof. During this time the upper end of the branch passage 56 is partly in register with the passage portion 40 so that fluid in the reservoir 44 gravitates into the branch passage 56, through the shunt passage 64 and venturi throat 54 into the adjacent end of the valve chamber 37 to tend to move the valve element 38 to its centrally disposed neutral position of FIGS. 2 and 4, wherein the valve spool 58 closes off the upper end of the branch passage 56. This movement of the valve element 38 is a continuation of the movement imparted thereto by closing movements of the check ball 30 of the closing primary check valve 26. Although not shown, it will be appreciated that the pump operating motor including the armature 9 may be controlled by pressure operated switches or limit switches operated by the piston rod 36 or apparatus moved thereby. Such control apparatus does not constitute a part of the instant invention, and showing and detailed description thereof is omitted, in the interest of brevity.

Motor imparted rotation of the pump members 16 and 17 in an opposite direction, to deliver fluid under pressure to the cylinder 34 through the conduit 33 to the pump and valve means, involves the delivery of a greater volume of fluid to the cylinder 34 than is removed therefrom. In this situation, the valve element 38 will be moved to the right with respect to FIG. 2 to open the check valve 27 and simultaneously cause the passage portion 40 to register with the upper end of the branch passage 57. Fluid is then drawn from the reservoir 44 through the branch passage 57, opening the ball check 61, so that fluid from the reservoir 44 is added to the fluid returning to the conduit 33 to the inlet side of the pump. Fluid flowing through the venturi portion 53 tends to draw fluid from the reservoir 44 through the shunt passage 65 whereby to supercharge the supply of fluid to the pump to prevent cavitation in the pump.

From the above, it will be seen that, with the use of the secondary check valves 60 and 61, venturi passages 52 and 53, and shunt passages 64 and 65, the pump is assured of an ample volume of fluid at all times and under varying conditions of operation in either direction of flow of fluid. Further, the pressure operated valve element 38 assures smooth operation due to the control thereof by pressure in the return line to the pump and that which is exerted by the pump in the fluid passages and delivery lines to the motor to be operated.

While I have shown and described a commercial embodiment of pump and valve means, it will be understood that the same is capable of modification without departure from the spirit and scope of the invention, as defined in the claims.

What is claimed is:

1. A pump and valve means comprising:
   a. a housing defining a pump chamber, a cylindrical valve chamber, spaced fluid ports providing inlet and outlet means to said valve chamber, and passage means including fluid passages extending from spaced portions of said valve chamber to spaced portions of said pump chamber;
   b. pump means in said pump chamber operative to pump fluids selectively through said passage means toward said spaced portions of the valve chamber;
   c. a pair of primary check valves each disposed between a different one of said spaced ports and a different one of said spaced portions of the valve chamber and each including a check valve member and an annular seat defining one end of a check valve opening of predetermined diameter to a respective end of said valve chamber, each of said check valve members being yieldingly urged toward engagement with its respective valve seat;

d. a valve element mounted in said valve chamber for movement alternately in opposite directions toward said check valve members and having opposite portions each engageable with a different one of said check valve members to move the same out of seating engagement with its respective valve seat;

e. said valve element having opposite surface portions each having a total surface area substantially greater than the area of an adjacent one of said openings and exposed to pressure of fluid in said passage means to move into check valve opening engagement with one of said check valve members responsive to predetermined fluid pressure against said surface area adjacent the other of said check valve members;

f. said valve element including a longitudinally central portion defining a fluid passage portion communicating with a fluid reservoir;

g. said passage means including relatively large diameter branch passages selectively communicating with said passage portions and a respective one of said fluid passages responsive to predetermined movement of said valve element in opposite directions from a neutral position intermediate the opposite ends of said valve chambers;

h. and a pair of secondary check valves one each disposed in a different one of said branch passages, said secondary check valves being arranged to prevent return flow of fluid to said fluid passage portion through their respective branch passages;

i. said passage means further including a pair of relatively small diameter shunt passages each connecting a different one of said fluid passages with a respective one of said branch passages between its respective secondary check valve and said valve chamber and passage portion.

2. The pump and valve means defined in claim 1 in which each of said fluid passages includes a portion tapering from a relatively larger diameter to a relatively smaller diameter adjacent said valve chamber to provide a venturi throat, said shunt passages each communicating with said fluid passages at the venturi throat thereof.

* * * * *